US009708553B2

(12) United States Patent
Find et al.

(10) Patent No.: US 9,708,553 B2
(45) Date of Patent: Jul. 18, 2017

(54) METHOD FOR HANDLING PRODUCT FLUID FLOWS

(75) Inventors: Josef Find, Schwetzingen (DE); Alfred Haas, Eppelheim (DE); Armin Brenner, Eppelheim (DE)

(73) Assignee: hte GmbH the high throughput experimentation company, Heidelberg (DE)

( * ) Notice: Subject to any disclaimer, the term of this patent is extended or adjusted under 35 U.S.C. 154(b) by 346 days.

(21) Appl. No.: 14/236,994

(22) PCT Filed: Jul. 30, 2012

(86) PCT No.: PCT/EP2012/064850

§ 371 (c)(1), (2), (4) Date: Feb. 4, 2014

(87) PCT Pub. No.: WO2013/017556

PCT Pub. Date: Feb. 7, 2013

(65) Prior Publication Data

US 2014/0174987 A1 Jun. 26, 2014

(30) Foreign Application Priority Data

Aug. 4, 2011 (DE) ........................ 10 2011 109 454

(51) Int. Cl.

| | |
|---|---|
| ***C10G 65/14*** | (2006.01) |
| ***C10G 45/22*** | (2006.01) |
| ***C10G 29/02*** | (2006.01) |
| ***B01J 19/00*** | (2006.01) |
| ***C40B 30/08*** | (2006.01) |
| ***C40B 60/12*** | (2006.01) |

(52) U.S. Cl.

CPC .......... *C10G 65/14* (2013.01); *B01J 19/0046* (2013.01); *C10G 29/02* (2013.01); *C10G 45/22* (2013.01); *C40B 30/08* (2013.01); *C40B 60/12* (2013.01); *B01J 2219/0072* (2013.01); *B01J 2219/00286* (2013.01); *B01J 2219/00306* (2013.01); *B01J 2219/00389* (2013.01); *B01J 2219/00418* (2013.01); *B01J 2219/00477* (2013.01); *B01J 2219/00495* (2013.01); *B01J 2219/00585* (2013.01); *B01J 2219/00698* (2013.01); *B01J 2219/00707* (2013.01); *B01J 2219/00747* (2013.01)

(58) Field of Classification Search

CPC .......... B01J 19/0046; B01J 2219/00286; B01J 2219/00306; B01J 2219/00389; B01J 2219/00418; B01J 2219/00477; B01J 2219/00495; B01J 2219/00585; B01J 2219/00698; B01J 2219/00707; B01J 2219/0072; B01J 2219/00747; C10G 29/02; C10G 45/22

See application file for complete search history.

(56) References Cited

U.S. PATENT DOCUMENTS

| | | | |
|---|---|---|---|
| 6,548,305 | B1 | 4/2003 | Deves et al. |
| 2004/0115100 | A1 | 6/2004 | van den Brink et al. |
| 2004/0202573 | A1 | 10/2004 | van den Brink et al. |
| 2010/0320121 | A1 | 12/2010 | Bauman et al. |

FOREIGN PATENT DOCUMENTS

| | | | |
|---|---|---|---|
| JP | 2005-519750 | A | 7/2005 |
| JP | 2007-515646 | A | 6/2007 |
| WO | WO 02/092220 | A1 | 11/2002 |
| WO | WO 03/078053 | A1 | 9/2003 |
| WO | WO 2005/063372 | A2 | 7/2005 |
| WO | WO 2006/107187 | A1 | 10/2006 |
| WO | WO 2008/012073 | A1 | 1/2008 |
| WO | WO 2008/055585 | A1 | 5/2008 |
| WO | WO 2008/080365 | A1 | 7/2008 |

OTHER PUBLICATIONS

Parkash, S, Refining Processes Handbook, 2003, Gulf Publishing, pp. 29-61.*

International Search Report issued Oct. 23, 2012 in PCT/EP2012/064850.

Japanese Office Action issued Jun. 14, 2016 in Patent Application No. 2014-523296 (with English Translation).

* cited by examiner

*Primary Examiner* — Renee Robinson
*Assistant Examiner* — Derek Mueller
(74) *Attorney, Agent, or Firm* — Oblon, McClelland, Maier & Neustadt, L.L.P.

(57) ABSTRACT

The present invention relates to a process for handling product fluid streams which are obtained in the catalytic hydrogenation of liquid feeds in laboratory catalysis apparatuses. The liquid feeds are preferably hydrocarbons comprising sulfur- and nitrogen-comprising compounds as impurities. The hydrogenation serves to convert the impurities into hydrogen sulfide and ammonia which in this form can be readily separated off from the other constituents of the liquid feed. The product fluid streams are contacted with an inert gas stream, with the flow rate of the inert gas being a multiple of the flow rate of the product fluid stream. The formation of deposits in lines of the region on the outlet side of the reaction space can be effectively prevented by means of the process of the invention.

18 Claims, No Drawings

METHOD FOR HANDLING PRODUCT FLUID FLOWS

CROSS-REFERENCE TO RELATED APPLICATIONS

This application is a National Stage of PCT/EP2012/064850, which was filed on Jul. 30, 2012. This application is based upon and claims the benefit of priority to German Application No. 10 2011 109 454.0, which was filed on Aug. 4, 2011.

The invention relates to a process for treating product fluid streams in an arrangement of two or more reactors, in particular in reactors on a laboratory scale, wherein the product fluid streams are preferably formed in the catalytic desulfurization or denitrification of liquid feeds in the presence of hydrogen. The process of the invention is preferably used in the field of high-throughput research. Preference is here given to laboratory reaction apparatuses in which a plurality or a large number of reaction spaces are arranged in parallel and in which the process of the invention is used for accelerated development of solid-state catalysts or for accelerated optimization of process conditions.

The work-up of oil residues and liquid feeds which have a high degree of contamination with sulfur- and nitrogen-comprising compounds, because of, inter alia, the increasing shortage and increasing costs of raw materials, is of particularly great economic and technical interest. For this reason, it is necessary to provide, on the basis of research and development, new processes and improved catalysts which make the oil residues and feeds having a high degree of contamination more usable. However, particularly in the laboratory sector, the use of experimental catalytic apparatuses for processing of oil residues and feeds having a high degree of contamination is greatly limited, so that it is often not possible to carry out long-term tests.

The experimental measurement data which are achieved in long-term operation of catalytic experiments according to the prior art by means of laboratory catalysis apparatuses are, particularly in the case of reaction of heavy oil residues, merely of low predictive power. For this reason, it is generally necessary to carry out comprehensive and costly comparative studies in larger catalytic test apparatuses, for example pilot plants, since it is easier here to reproduce experimental conditions which are very close to the conditions in large-scale industrial plants in refineries.

One of the objects of the invention is to improve the long-term stability in operation of laboratory catalysis apparatuses, i.e. reactors on the "laboratory scale". A further object is to develop technical opportunities of treating product fluid streams obtained in the processing of fluid feeds having a high degree of contamination in laboratory catalysis apparatuses. The contaminants are, in particular, sulfur- and nitrogen-comprising compounds.

The objects mentioned here and further objects not mentioned here are achieved by a process according to claim 1 for the continuous treatment of product streams. This is a process for treating product fluid streams in an arrangement of two or more reactors, in particular in reactors on the laboratory scale (laboratory catalysis apparatuses) having two or more reaction spaces arranged in parallel, wherein (a) a starting fluid stream comprising a liquid feed and hydrogen or another reaction gas or a liquid feed, hydrogen (or another reaction gas) and carrier gas is fed to each of the individual reaction spaces and (b) the product gas streams exiting from the individual reaction spaces are each transferred into a separate separator, and inert gas is fed into the individual regions at the outlet side of the reaction space, preferably between the reaction spaces and the separators or between the separators and the outlet-side flow restrictor and the ratio of the volume flow of the inert gas ($V_{IG}$) to the volume flow of the product fluid stream ($V_{PFS}$) $V_{IG}/V_{PFS}$ is ≥2 or ≥5.

Preference is given to a volume flow ratio of $V_{IG}/V_{PFS}$ of ≥10, and the volume flow ratio of $V_{IG}/V_{PFS}$ is more preferably ≥20.

For the purposes of the present invention, a "treatment" is preferably a contacting of a product fluid stream with at least one gas or gas mixture.

Furthermore, preference is given for the purposes of the present invention to the reaction spaces having an internal volume of less than 500 ml, preferably less than 250 ml, more preferably less than 100 ml, more preferably less than 50 ml and particularly preferably less than 10 ml. The individual reaction spaces of the catalysis apparatus more preferably have an internal volume in the range from 0.2 ml to 100 ml, more preferably an internal volume in the range from 0.5 ml to 50 ml.

The proportion of gaseous nitrogen in the inert gas is preferably equal to or greater than 50%; the gaseous proportion of nitrogen in the inert gas is preferably equal to or greater than 90% and the gaseous proportion of nitrogen in the inert gas is more preferably greater than or equal to 95%.

The carrier gas which is added to the starting fluid or is a constituent of the starting fluid is or comprises, in a preferred embodiment, gaseous nitrogen. Both the carrier gas and the inert gas can comprise trace gases which are used as internal standard for calibrating flows and gas streams. As trace gas, it is possible to use, for example, argon.

The liquid feed for the purposes of the present invention preferably comprises a material selected from the class of oils, heavy oils, heating oils, diesel, gasoline, VGO (vacuum gas oils) and/or atmospheric residues (long resid).

The process of the invention preferably relates to liquid feeds which comprise both sulfur-comprising compounds and nitrogen-comprising compounds, where the sulfur-comprising compounds preferably have a sulfur content of from 0.01 to 10% by weight of sulfur and the nitrogen-comprising compounds preferably have a nitrogen content of from 0.1 to 5% by weight; greater preference is given to a sulfur content in the range from 0.5 to 7% by weight and a nitrogen content in the range from 0.5 to 5% by weight, in each case based on the total weight of the feed.

The amount of liquid feed which is conveyed into the respective reaction space can by way of example be reported as the LHSV ("liquid hourly space velocity"). The LHSV is preferably in the range from 0.05 to 10 $h^{-1}$, more preferably in the range from 0.5 to 3 $h^{-1}$.

As regards the duration of the experiment, the process of the invention is particularly preferably used in long-term studies, with the process of the invention being of particularly great advantage in this context. For the purposes of the present invention, the term long-term studies refers to preferably continuous experiments whose duration is one day or more, with the duration of the experiments preferably being 10 days or more, more preferably 20 days or more, even more preferably 30 days or more. For the purposes of the present invention, long-term studies also include those having a duration of 100 days or more.

The technical structure of a laboratory catalysis apparatus in respect of its basic components, which structure can be used for the process of the invention, is known in principle from the prior art and is disclosed, for example, in the patent applications WO 2005/063372 A2, WO 2008/055585 A1 and WO 2008/012073 A1. Such catalysis apparatuses comprise components having small dimensions. These components include, inter alia, connecting lines, flow restrictor lines and closure elements of valves, with the components being in direct contact with the streams which are processed further in the apparatus.

To carry out the process of the invention, particular preference is given to the apparatus having feed lines for inert gas in the region between the outlets of the reaction spaces and the separators. In this preferred embodiment, the formation of $NH_4S_x$ directly at the reactor outlet is prevented in the case of $NH_3$ and $H_2S$ being present in the gas phase at the reactor inlet.

As regards to the dimensions of the components mentioned here, preference is given to the connecting lines in the apparatus used in the process of the invention having an internal diameter in the range from 1 mm to 10 mm, with an internal diameter in the range from 1 mm to 5 mm being preferred. The flow restrictor lines preferably have an internal diameter in the range from 50 μm to 1000 μm, with the internal diameter preferably being in the range from 75 μm to 500 μm and more preferably in the range from 100 μm to 250 μm.

As liquid feeds, it is possible to use, inter alia, oils, gasolines, diesel mixtures, heavy naphtha's, vacuum gas oils, crude oils. The respective experimental conditions also depend on the properties of the liquid feed, with more demanding experimental conditions being necessary for the processing and handling of a heavy oil than for the processing of gasoline or light heating oil.

It has now surprisingly been discovered that the handling of product fluid streams can be carried out particularly advantageously especially when it is carried out according to the process of the invention. Here, it is possible to largely suppress or even completely prevent the formation of deposits on the surfaces of the components.

It may be emphasized that the process of the invention makes it possible to subject, in particular, relatively nonvolatile feeds having a high degree of contamination with sulfur- and nitrogen-comprising compounds to a reliable and robust laboratory examination process. The process enables reaction conditions carried out in large-scale industrial plants to be reproduced realistically and over long periods of time on the laboratory scale, too.

The removal of the impurities preferably relates to the catalytic hydrogenation of sulfur-comprising and nitrogen-comprising compounds which are to be converted by means of catalytic reactions preferably completely into hydrogen sulfide and ammonia. However, owing to the chemical and physical process conditions, complete conversion is usually not possible. In addition, the components formed also decompose or react further, with ammonium sulfide-comprising compounds $NH_4S_x$, inter alia, also being able to be formed. A large role in the formation of deposits is played by the fact that a higher temperature prevails in the reaction spaces than in the regions at the outlet side of the reaction space. The formation of such deposits is based on complex reactions and the composition of such deposits depends on the respective reaction system. It can be assumed that different polysulfides or ammonium sulfides are formed at least in the abovementioned reactions.

In the prior art, attempts are made to suppress the formation of deposits in the conduit tubes by heating the tubes. However, there are limits to heating of the lines, associated with the fact that undesired subsequent reactions can occur at elevated temperatures and that cooling is necessary on introduction of the product fluid stream into the separators in order to be able to effect the most effective separation possible of volatile and less volatile constituents.

Furthermore, the process of the invention is, in the case of laboratory catalysis apparatuses, having reactors arranged in parallel, preferably used both in conjunction with main stream pressure regulation and in conjunction with secondary stream pressure regulation. An illustrative embodiment of main stream pressure regulation is disclosed in WO 2006/107187 A1. An illustrative presentation of secondary stream pressure regulation is disclosed in the PCT applications WO 2005/063372 A2, WO 2008/055585 A1 and WO 2008/012073 A1 and is in this respect fully incorporated by reference into the present invention.

In the case of main stream pressure regulation, the active regulating elements are preferably located directly in the product fluid stream. After-regulation is in this case preferably in conjunction with the movement of a valve needle within a valve. If deposits are formed, the interference can be compensated to a certain extent by an after-regulation mechanism. In addition, the movement of the valve needles can also lead to the formation of deposits being impaired or the deposits flaking off again.

The process of the invention is preferably used in conjunction with secondary stream pressure regulation. In the case of secondary stream pressure regulation, the components responsible for regulation are not exposed directly to the product fluid stream. The cross sections of the lines and components and also the temperatures thereof exert a substantial influence on the formation of sulfur- and nitrogen-comprising deposits here. In general, lines and components having very small conduit cross sections are particularly susceptible to deposits since even a small amount of deposits can result in blockage of the lines. The conduit cross sections of the laboratory catalysis apparatuses with secondary stream regulation are in the range from 0.1 mm to 10 mm, but line elements having cross sections in the range from 5 μm to 500 μm are also comprised.

The formation of troublesome deposits can be largely prevented by means of the process of the invention. An advantage is that the running times of laboratory apparatuses can be extended further even under demanding experimental conditions in respect of the pressure and the temperature without the quality of the data being restricted thereby. Prevailing pressures are in the range from 5 bar to 300 bar, preferably from 10 bar to 200 bar. For example, experiments which have hitherto been able to be carried out only over a period of from 10 hours to 30 days can now be carried out without problems over a number of weeks and up to six months or even up to twelve months. The measured data have a low scatter and good reproducibility, which are superior to the process known from the prior art.

The preferred field of application of the invention is in laboratory catalysis apparatuses. However, there is also a field of use in microreactors having reactors arranged in parallel since these are particularly susceptible to the formation of deposits because of the small dimensions of the components. It has hitherto been extremely difficult or virtually impossible to examine relatively nonvolatile residual oils in microapparatuses. In microapparatuses, the reactor dimensions are in the region of less than or equal to 1 ml and the amounts of catalyst samples to be examined are often in the range from 10 mg to 500 mg. The conduit cross sections of the microapparatuses are typically in the range from 10 μm to 500 μm.

The catalytic reaction of the liquid feeds employed in the process of the invention is preferably carried out at temperatures in the range from 50° C. to 700° C. and pressures in the range from 10 bar to 250 bar. Further preference is given to the temperatures in the catalytic reactions being in the range from 100° C. to 500° C. and the pressures being in the range from 20 bar to 200 bar.

Since the process of the invention is associated with dilution of the product fluid stream because of the introduction of comparatively large amounts of inert gas into the product fluid stream, matching of the analytical characterization methods to this dilution is preferred. The sensitivity of the measurement instruments is sufficient in order to characterize the low concentrations of compounds in the greatly diluted product fluid streams.

In a preferred embodiment of the process of the invention, virtually exclusively or only the hydrocarbon-comprising components are measured by means of analytical measuring instruments. In another preferred embodiment of the process of the invention, the amount of ammonia and/or hydrogen sulfide is also analyzed in addition to the hydrocarbon-comprising compounds. The present invention is not restricted to the use of a specific analytical system but instead the analytical system which is particularly suitable for the reaction system in question is used.

EXAMPLES

In an example, catalytic hydrogenation reactions of heavy residual oil ("long resid" of the brand Texas-Blend from the USA) were carried out by means of a catalysis apparatus disclosed in WO 2005/063372 A2. In the catalysis apparatus, sixteen reaction spaces were arranged in parallel. The residual oil had a sulfur content of 3.8% by weight and a nitrogen content of 1% by weight, with sulfur and nitrogen being present in bound form as hydrocarbon compounds.

The catalytic reaction of the oil was carried out at a reaction temperature of 420° C. and a reaction pressure of 125 bar. The temperature in the region at the outlet side of the reaction space, in particular in the connecting lines and in the separators, was 120° C. The hydrogenation reactions were carried out using the process of the invention, with nitrogen being introduced into the product fluid stream by means of a pressure-regulating gas line and the volume flow of nitrogen introduced being, as a difference from the processes of the prior art, ten times as high as the volume flow of the product fluid. It was surprisingly found that no deposits were detected in the lines when the process was carried out continuously over a period of 60 days. The proportion of sulfur- and nitrogen-comprising compounds was reduced by an average of 90% over the total duration of the experiment compared to the process conditions of the prior art. In the study, two solid-state catalysts which have a higher conversion in respect of hydrogen sulfide formation than the other solid-state catalysts were able to be identified from among the many catalysts examined.

As comparative example, the reaction was carried out using a very much lower rate of introduction of pressure-regulating gas, i.e. without the excess according to the invention of inert gas. Deposits in the lines in the region at the outlet side of the reaction space were detected after only a few days and greatly impaired the study.

The invention claimed is:

1. A process for treating product fluid streams in an arrangement of two or more reactors having two or more reaction spaces arranged in parallel, the process comprising:

(I) feeding a starting fluid stream comprising a liquid feed and hydrogen or another reaction gas, or the liquid feed, the hydrogen or another reaction gas, and a carrier gas, into individual reaction spaces of two or more reactors arranged in parallel;

(II) transferring product fluid streams exiting from the individual reaction spaces into individual separators; and (III) feeding an inert gas into individual regions located at outlets of the individual reaction spaces, wherein:

a ratio of a volume flow of the inert gas ($V_{IG}$) to a volume flow of the product fluid streams ($V_{PFS}$), $V_{IG}/V_{PFS}$ is controlled such that formation of byproduct deposits at the outlets of the individual reaction spaces is prevented after continuous operating of the process for a period of 10 days or more; and the ratio $V_{IG}/V_{PFS}$ is greater than or equal to 5.

2. The process according to claim 1, wherein a proportion of gaseous nitrogen in the inert gas is equal to or greater than 50%.

3. The process according to claim 1, wherein the liquid feed comprises a material selected from the group consisting of oil, heavy oil, heating oil, diesel, gasoline, GVO (gas vacuum oil), and atmospheric residue.

4. The process according to claim 1, wherein the liquid feed comprises both sulfur-comprising compounds and nitrogen-comprising compounds, the sulfur-comprising compounds amount to a sulfur content of from 0.1 to 10% by weight of sulfur, and the nitrogen-comprising compounds amount to a nitrogen content of from 0.1 to 5% by weight, based on a total weight of the liquid feed.

5. The process according to claim 1, wherein temperatures in the individual reaction spaces range from 100° C. to 700° C. and pressures in the individual reaction spaces range from 20 bar to 250 bar.

6. The process according to claim 1, wherein:

an amount of the starting fluid stream fed into each of the individual reaction spaces has a liquid hourly space velocity (LHSV) of from 0.05 to 10 $h^{-1}$; and each individual reaction space has an internal volume of from 0.2 to 100 ml.

7. The process according to claim 1, wherein the individual reaction spaces have an internal volume of less than 500 ml.

8. The process according to claim 1, wherein the two or more reactors are laboratory scale reactors.

9. The process according to claim 1, wherein the feeding (III) of the inert gas comprises feeding the inert gas into the individual regions which are situated between the individual reaction spaces and the individual separators.

10. The process according to claim 1, wherein the volume flow ratio $V_{IG}/V_{PFS}$ is ≥10.

11. The process according to claim 1, wherein the volume flow ratio $V_{IG}/V_{PFS}$ is ≥20.

12. The process according to claim 1, wherein a proportion of gaseous nitrogen in the inert gas is equal to or greater than 90%.

13. The process according to claim 1, wherein a proportion of gaseous nitrogen in the inert gas is equal to or greater than 95%.

14. The process according to claim 4, wherein the sulfur content is from 0.5 to 7% by weight.

15. The process according to claim 5, wherein the temperatures in the individual reaction spaces range from 150 to 550° C. and the pressures in the individual reaction spaces range from 50 to 200 bar.

16. The process according to claim 6, wherein:

the amount of starting fluid stream fed into each of the individual reaction spaces has a liquid hourly space velocity (LHSV) of from 0.5 to 3 $h^{-1}$; and each individual reaction space is joined to an apparatus having an internal volume of from 1 to 50 ml.

17. The process according to claim 1, wherein the two or more reaction spaces each have an internal volume of less than 250 ml.

18. The process according to claim 1, wherein the two or more reaction spaces each have an internal volume of from 0.2 ml to 100 ml.

* * * * *